No. 871,203. PATENTED NOV. 19, 1907.
J. H. BURHOP.
MOWING MACHINE.
APPLICATION FILED AUG. 9, 1905.

2 SHEETS—SHEET 1.

Witnesses
Jas. K. McCathran
J. F. Riley

John H. Burhop, Inventor
By E. G. Siggers
Attorney

No. 871,203. PATENTED NOV. 19, 1907.
J. H. BURHOP.
MOWING MACHINE.
APPLICATION FILED AUG. 9, 1905.
2 SHEETS—SHEET 2.
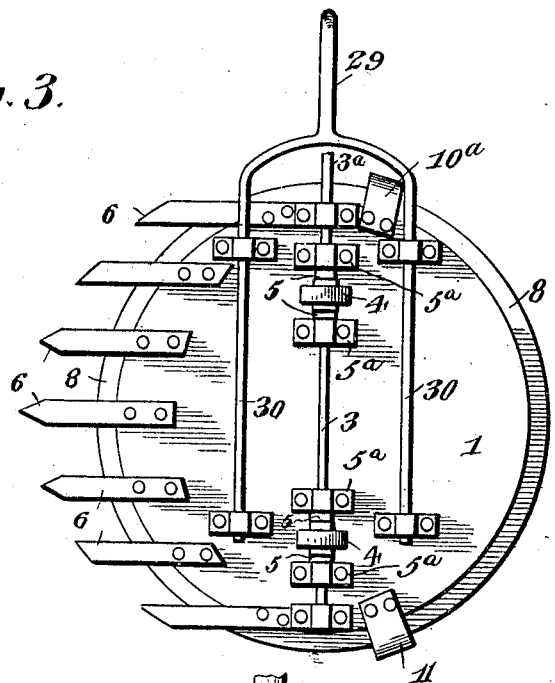
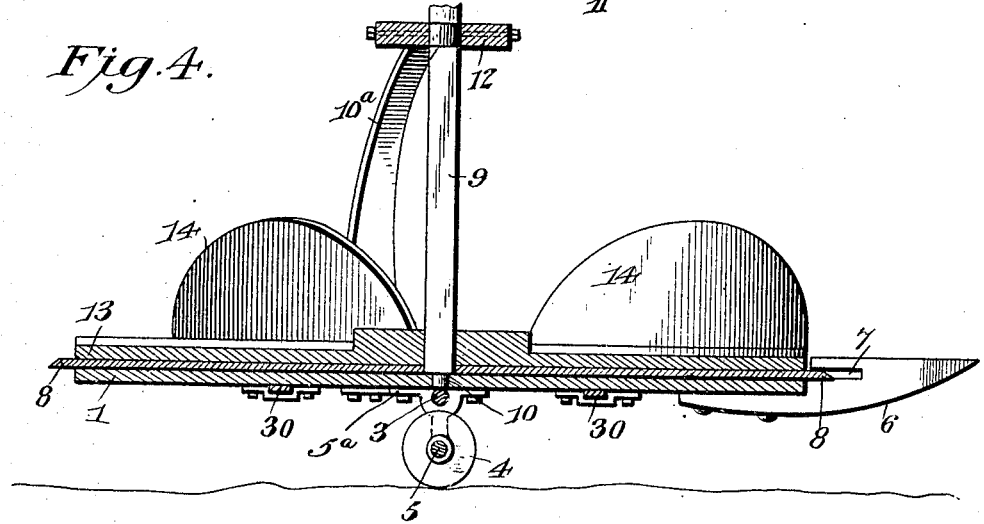
John H. Burhop, Inventor

UNITED STATES PATENT OFFICE.

JOHN HENRY BURHOP, OF PYATT, ARKANSAS.

MOWING-MACHINE.

No. 871,203.  Specification of Letters Patent.  Patented Nov. 19, 1907.

Application filed August 9, 1905. Serial No. 273,395.

*To all whom it may concern:*

Be it known that JOHN HENRY BURHOP, a citizen of the United States, residing at Pyatt, in the county of Marion and State of Arkansas, has invented a new and useful Mowing-Machine, of which the following is a specification.

The invention relates to improvements in mowing machines.

The object of the present invention is to improve the construction of mowing machines, and to provide a simple and comparatively inexpensive one, having a rotary knife or cutter, adapted to cut hay and grass more rapidly and with less power than an ordinary reciprocating cutter bar, and capable of being readily tilted for arranging its engaging or cutting portion at the desired elevation to cut hay and grass the proper length.

Also the invention has for its object to provide a mower having a cutting apparatus, which will operate with less noise than a reciprocating apparatus and in which the knife or cutter will dull less rapidly than the ordinary reciprocating knife or cutter.

With these and other objects in view, the invention consists in the construction and novel combination and arrangement of parts, hereinafter fully described, illustrated in the accompanying drawings, and pointed out in the claims hereto appended.

Figure 1:
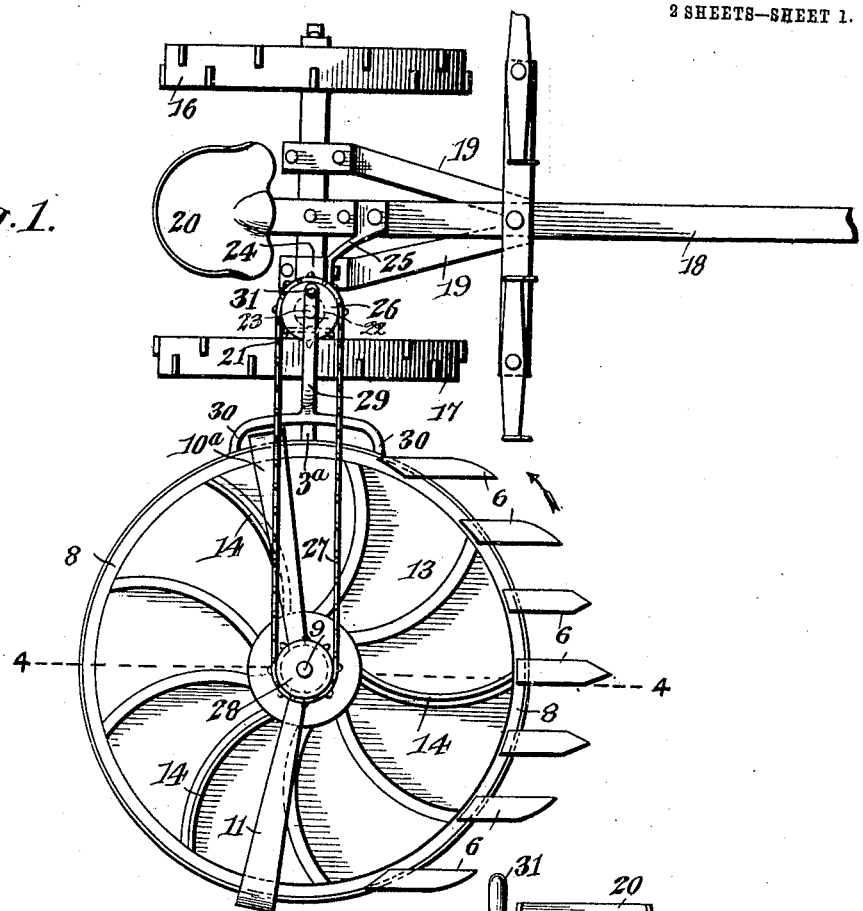
Figure 2:
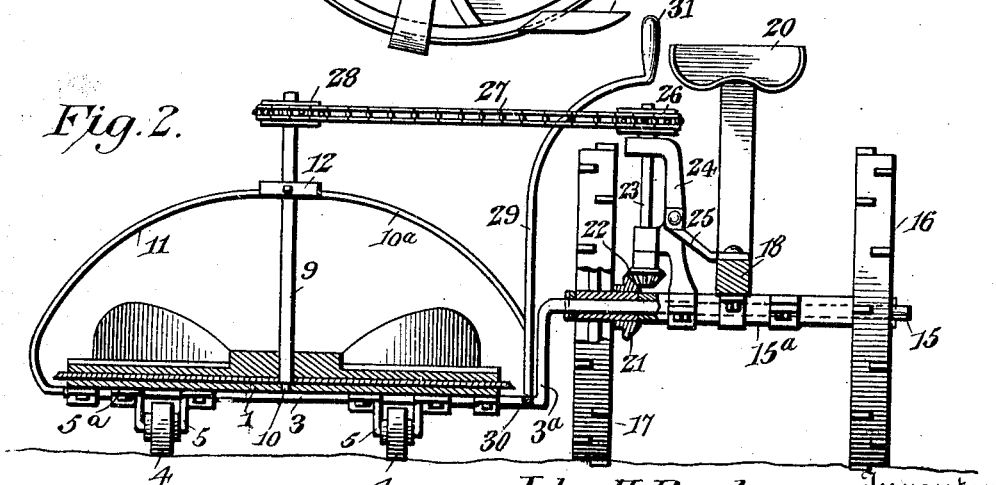

In the drawings:—Figure 1 is a plan view of a mower, constructed in accordance with this invention. Fig. 2 is a transverse sectional view of the same. Fig. 3 is a reverse plan view of the cutting apparatus. Fig. 4 is an enlarged sectional view, taken substantially on the line 4—4 of Fig. 1.

Like numerals of reference designate corresponding parts in all the figures of the drawings.

1 designates a substantially circular base, tiltable forwardly and rearwardly, and mounted on a transverse bar or pivot member 3 and supported by a pair of transversely alined wheels 4, which are mounted in suitable brackets 5, depending from the base, as clearly shown in Fig. 2 of the drawings. The brackets, which are composed of two sides and which carry a shaft or axle for the rollers or wheels 4, are preferably provided with enlarged ends, forming attachment plates 5ª and secured to the lower face of the base and retaining the same form and constituting bearings for the transverse bar or pivot member. The attachment plates of the brackets are extended in advance and in rear of the bar or pivot member 3, and are perforated for the reception of suitable fastening devices. By this construction the base is supported above the surface of the ground at opposite sides of the center, and the bar or member 3 forms a central pivot or pintle on which the base is adapted to tilt for raising and lowering its front portion to arrange the same at the desired elevation to cut the grass or hay the proper length.

The circular base is provided at its front with a curved series of projecting guard fingers 6, secured at their inner ends to the lower face of the circular base, and provided with the usual slot or opening 7 for the reception of the cutting edge of a knife or cutter 8. The knife or cutter 8, which is circular, is provided with a peripheral cutting edge, and it is adapted to be continuously rotated by the means hereinafter described for cutting hay and grass. It will make less noise than the ordinary reciprocatory cutting apparatus, and it will not dull as quickly as the reciprocating cutter bar thereof.

The rotary knife or cutter, which projects beyond the periphery of the base, is mounted on a vertical shaft 9, having a reduced lower end 10, which is journaled in a central bearing of the circular base. The shaft 9, which is preferably squared, is supported by suitable braces 10ª and 11, curved longitudinally and having inturned ends secured to the lower face of the base. The upper ends of the opposite braces 10ª and 11 are connected with a suitable bearing 12, which receives the upper portion of the shaft, and the latter is provided thereat with a rounded bearing portion.

The upright shaft also has a hay tossing device, consisting of a disk 13 of the same diameter as the circular base. This rotary hay tossing device is arranged on the upper face of and rotates with the knife or cutter, and it is provided with a series of radially arranged upwardly extending blades or wings 14, curved longitudinally and presenting concave faces, which are arranged in the direction of rotation for engaging the cut grass or hay. The blades or wings taper vertically from the center to each end and have curved upper edges, as clearly shown in Figs. 2 and 4 of the drawings. The rotation of the hay tossing device in the direction of the arrow in Fig. 1 of the drawings, carries the upwardly extending blades or wings across the front of the rotary cutting apparatus and rearwardly at the inner side thereof.

The transverse bar or member 3, which pivotally connects the cutting apparatus with the wheeled frame, preferably consists of an extension of an axle or shaft 15, on which is arranged carrying wheels 16 and 17 and to which is secured the rear end of a draft beam or tongue 18. The transverse bar or pivot member is arranged below the plane of the shaft or axle of the wheeled frame, and is connected with the same by a short upright portion $3^a$. The shaft or axle 15 is also connected with the draft beam or tongue by means of a pair of oppositely disposed forwardly converging braces 19, secured at their front ends to the lower faces of the draft beam or tongue, and connected at their rear ends with the shaft or axle at points between the wheels. A sleeve $15^a$ is preferably arranged on the axle to receive the clips, or other fastening devices for connecting the braces and the draft beam or tongue to the same, as this construction will permit the draft beam or tongue to swing upwardly and downwardly on the shaft or axle, independently of the pivotal movement of the cutting apparatus. A seat 20 is mounted on the rear end of the draft tongue for the accommodation of the driver, and is provided with a suitable standard extending rearwardly and upwardly at an inclination.

The inner wheel 17, which is arranged adjacent the cutting apparatus, is provided with an extended hub on which is mounted a bevel gear 21, located at the inner end of the hub and meshing with a bevel pinion 22 of an inner upright shaft 23, which is journaled in suitable bearings of an upright bracket 24. The upright bracket 24, which is mounted on the sleeve $15^a$ is braced by an inclined bar or piece 25, extending from an intermediate portion of the bracket to the rear portion of the draft tongue or beam. The upper end of the inner shaft carries a sprocket wheel 26, which is connected by a sprocket chain 27 with a similar sprocket wheel 28, mounted on the upper end of the outer upright shaft 9 of the cutting apparatus. When the machine moves forward, motion will be communicated from the inner wheel through the bevel gearing and the sprocket gearing to the vertical shaft, and the inner circular cutter will be rapidly rotated. The bevel gearing, which connects the lower end of the inner vertical shaft with the wheel 17, and sprocket gearing, which connects the inner and outer shafts, may be of any desired size to secure the necessary speed of the rotary cutter, and various forms of gearing may be employed for transmitting motion from the wheeled frame to the rotary cutter.

In order to enable the tiltable cutting apparatus to be readily controlled by the operator, a forked operating lever 29 is employed. The operating lever is provided with a horizontal forked portion 30, which is arranged on the lower face of and suitably secured to the circular base. The sides of the fork are located in advance and in rear of the transverse bar or pivot member 3, and extends from the inner side of the base to within a short distance of the outer side thereof. The said operating lever is also provided with an upwardly extending portion terminating in a handle or grip 31, arranged adjacent to the seat and adapted to be readily grasped by the operator.

Having thus fully described my invention, what I claim as new, and desire to secure by Letters Patent, is:—

In a machine of the class described, the combination of a wheeled frame provided with a laterally projecting bar or member, a cutting apparatus having a rotary cutter and tiltably mounted on the bar or member at a point beyond the wheeled frame, and a forked operating lever connected with the tiltable cutting apparatus at opposite sides of the bar or member.

In testimony, that I claim the foregoing as my own, I have hereto affixed my signature in the presence of two witnesses.

JOHN HENRY BURHOP.

Witnesses:
J. A. BRADY,
C. C. FOSTER.